United States Patent
Kong

(10) Patent No.: US 10,093,267 B2
(45) Date of Patent: Oct. 9, 2018

(54) CRASH PAD FOR VEHICLE HAVING INTEGRATED AIRBAG DOOR AND HOUSING AND METHOD OF MANUFACTURING THE SAME

(71) Applicant: Hyundai Motor Company, Seoul (KR)

(72) Inventor: Byung Seok Kong, Gunpo-si (KR)

(73) Assignee: Hyundai Motor Company, Seoul (KR)

( * ) Notice: Subject to any disclaimer, the term of this patent is extended or adjusted under 35 U.S.C. 154(b) by 57 days.

(21) Appl. No.: 15/284,718

(22) Filed: Oct. 4, 2016

(65) Prior Publication Data
US 2017/0267202 A1 Sep. 21, 2017

(30) Foreign Application Priority Data
Mar. 15, 2016 (KR) .......................... 10-2016-0030841

(51) Int. Cl.
*B60R 21/215* (2011.01)
*B60R 21/205* (2011.01)

(52) U.S. Cl.
CPC .......... *B60R 21/215* (2013.01); *B60R 21/205* (2013.01); *B60R 2021/21537* (2013.01)

(58) Field of Classification Search
CPC ... B60R 21/205; B60R 21/215; B60R 21/045; B60R 2021/21537; B60R 2021/26082; B60R 2021/26088; B29C 44/04; B29C 44/38; B29C 44/58; B29C 45/00
See application file for complete search history.

(56) References Cited

U.S. PATENT DOCUMENTS

| 6,042,139 | A | * | 3/2000 | Knox | B29C 45/14336 280/728.3 |
| 6,406,056 | B2 | * | 6/2002 | Yokota | B60R 21/205 280/728.2 |
| 6,746,042 | B2 | * | 6/2004 | Dannenhauer | B29C 44/12 280/728.3 |
| 6,921,105 | B2 | * | 7/2005 | Speelman | B60R 21/205 280/728.3 |
| 7,954,843 | B2 | * | 6/2011 | Evans | B60R 21/205 280/728.3 |
| 7,967,330 | B2 | * | 6/2011 | Kong | B29C 45/0081 280/728.3 |
| 8,017,049 | B2 | * | 9/2011 | Kong | B29C 45/1635 264/255 |

(Continued)

FOREIGN PATENT DOCUMENTS

JP 5-89119 U 12/1993
JP 10086702 A * 4/1998 .......... B29C 37/005

(Continued)

*Primary Examiner* — Laura Freedman
(74) *Attorney, Agent, or Firm* — Morgan, Lewis & Bockius LLP

(57) ABSTRACT

A crash pad for a vehicle having an integrated airbag door and housing may include a main body including a crash pad core, and an airbag housing integrally formed at a center of the crash pad core defining a space for accommodation of an airbag cushion therein, and an airbag door integrally injection-molded with the main body selectively to open and close the space in the airbag housing, the molded airbag door disposed upright in a direction in which the molded airbag door may be discharged from a mold to open the airbag housing.

12 Claims, 3 Drawing Sheets

(56) References Cited

U.S. PATENT DOCUMENTS

| | | | | |
|---|---|---|---|---|
| 8,240,703 B2* | 8/2012 | Yeon | ............... | B60R 21/215 280/728.3 |
| 8,336,907 B2* | 12/2012 | Nogaret | ............... | B29C 44/086 264/328.1 |
| 8,469,393 B1* | 6/2013 | Siewert | ............... | B60R 21/215 280/728.3 |
| 8,474,861 B1* | 7/2013 | Twork | ............... | B60R 21/215 280/728.3 |
| 8,870,219 B1* | 10/2014 | Roy | ............... | B60R 21/205 280/728.2 |
| 8,900,501 B2* | 12/2014 | Choi | ............... | B29C 45/0046 264/255 |
| 9,010,800 B1* | 4/2015 | Hunter | ............... | B60R 21/217 280/728.3 |
| 9,039,036 B1* | 5/2015 | Roy | ............... | B60R 21/215 280/728.3 |
| 9,481,337 B2* | 11/2016 | Cowelchuk | ............... | B60R 21/215 |
| 9,573,545 B1* | 2/2017 | Kong | ............... | B60R 21/215 |
| 9,757,884 B2* | 9/2017 | Kong | ............... | B29C 44/3403 |
| 2008/0042406 A1* | 2/2008 | Evans | ............... | B60R 21/2165 280/728.3 |
| 2008/0136145 A1* | 6/2008 | Kong | ............... | B60R 21/2165 280/728.3 |
| 2015/0224954 A1* | 8/2015 | Evans | ............... | B60R 21/215 156/73.5 |

FOREIGN PATENT DOCUMENTS

| | | |
|---|---|---|
| JP | 2004-196279 A | 7/2004 |
| KR | 10-2003-0050040 A | 6/2003 |
| KR | 10-0828817 B1 | 5/2008 |
| KR | 10-2010-0125861 A | 12/2010 |
| KR | 10-2012-0029945 A | 3/2012 |
| KR | 10-1316461 B1 | 10/2013 |

* cited by examiner

CRASH PAD FOR VEHICLE HAVING INTEGRATED AIRBAG DOOR AND HOUSING AND METHOD OF MANUFACTURING THE SAME

CROSS-REFERENCE TO RELATED APPLICATION

The present application claims priority to Korean Patent Application No. 10-2016-0030841, filed Mar. 15, 2016, the entire contents of which is incorporated herein for all purposes by this reference.

BACKGROUND OF THE INVENTION

Field of the Invention

Various aspects of the present invention relate to a crash pad for a vehicle having an integrated airbag door and housing and a method of manufacturing the same, and more particularly, to a crash pad for a vehicle having an integrated airbag door and housing and a method of manufacturing the same, in which an airbag housing, which accommodates an airbag therein, and an airbag door, which opens or closes the airbag housing, are integrally molded with the crash pad, and accordingly enhanced airbag deployment performance and improved external appearance and formability may be accomplished.

Description of Related Art

Generally, an airbag for a vehicle is a device that instantaneously inflates in the direction of a passenger when a car collision occurs, in order to protect the passenger from impact. The airbag is installed, for example, inside a steering wheel or inside a crash pad in front of a passenger's seat.

An airbag installed in front of a passenger's seat is commonly called a passenger-side airbag (PAB). As illustrated in FIG. 1, a conventional PAB module includes an inflator 1, which generates gas when a car collision occurs, an airbag cushion 2, which is inflated with gas supplied from the inflator 1, an airbag housing 4, which is installed below a crash pad core 3 in front of a passenger's seat and accommodates the airbag cushion 2 therein, and a door-integrated chute 5, which is coupled to the crash pad core 3 and to the airbag housing 4.

The door-integrated chute 5 includes an airbag door 6 and a chute 7, which is integrally or monolithically formed on the lower surface of the airbag door 6. The airbag door 6 has a holder 6a for coupling with the crash pad core 3, and the chute 7 has a hook holder 7a, on which a hook 4a of the airbag housing 4 is caught.

In addition, skin foam 8 is attached to the outer surfaces of the airbag door 6 and the crash pad core 3. The skin foam 8 includes a skin layer 8a and a foamed layer 8b on the inner surface of the skin layer 8a.

Through the combination of the airbag door 6, the crash pad core 3, and the skin foam 8, a crash pad is configured as the interior material of a vehicle, which is installed over the entire region in front side of a driver's seat and a passenger's seat.

When the foamed layer 8b is molded, however, the foam solution may leak from gaps at the connection between the crash pad core 3 and the airbag door 6 due to a foaming pressure, which may cause molding defects, and consequently, a poor external appearance.

In addition, upon deployment of the airbag cushion 2, the airbag cushion 2 may be pushed rearward by rearward pushing force, which is generated when the airbag cushion 2 comes into contact with the airbag door 6, thereby being torn by the hook holder 7a of the chute 7, which causes serious deterioration in the deployment performance of the airbag cushion 2.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a crash pad for a vehicle having an integrated airbag door and housing and a method of manufacturing the same, in which three existing pieces, namely a crash pad core, an airbag housing, and a door-integrated chute, are integrally molded to prevent problems from occurring at the connections between the respective pieces, and accordingly enhanced airbag deployment performance and improved formability may be accomplished.

According to various aspects of the present invention, a crash pad for a vehicle having an integrated airbag door and housing may include a main body including a crash pad core, and an airbag housing integrally or monolithically formed at a center of the crash pad core defining a space for accommodation of an airbag cushion therein, and an airbag door integrally injection-molded with the main body selectively to open and close the space in the airbag housing, the molded airbag door disposed upright in a direction in which the molded airbag door may be discharged from a mold to open the airbag housing.

The airbag door may include a hinge provided on one end of the airbag door for connection with the main body, and the hinge may be integrally molded with the main body as an airbag door resin for molding the hinge is introduced into a main body cavity of the mold in which a main body resin for molding the main body is introduced.

The hinge may include a first hinge integrally molded with the crash pad core for insertion into the crash pad core, and a second hinge integrally molded with the airbag housing for insertion into the crash pad core.

Injection molding of the airbag door resin may be delayed by a predetermined time compared to injection molding of the main body resin for introduction of the airbag door resin into the main body cavity, in which the main body resin is introduced, so as to form the hinge.

The airbag door may include a holding structure on an opposite end of the airbag door, in which the holding structure disposed on the opposite end of the airbag door may be fixedly assembled by pressure to a connection region between the crash pad core and the airbag housing.

The airbag door resin may be thermoplastic olefin (TPO), and the main body resin may be a composite of polypropylene (PP) and glass fiber (GF), for simultaneous molding of the airbag door and the main body via double injection.

Skin foam may be attached to an outer surface of the crash pad core and the airbag door, and the skin foam may include a skin layer and a foamed layer on an inner surface of the skin layer.

According to various aspects of the present invention, a method of manufacturing a crash pad for a vehicle having an integrated airbag door and housing may include a first process of providing a mold, which is used to integrally form a main body including a crash pad core and an airbag housing, with an airbag door via injection molding such that the injection-molded airbag door is disposed upright in a direction in which the airbag door is discharged from the mold so as to open the airbag housing, and a second process of simultaneously molding the main body and the airbag door to be integrally or monolithically formed with each other by introducing a main body resin and an airbag door resin into a main body cavity and an airbag door cavity of the mold, respectively.

In the mold provided in the first process, the main body cavity may be defined when an upper mold and a lower mold are closed, the upper mold may be provided at a bottom of the upper mold with a first upper slide core, which is configured to come into contact with the airbag door cavity, and a second upper slide core, which is configured to come into contact with the main body cavity at a position spaced apart from the airbag door cavity, and one end of the airbag door cavity may be integrally connected to the main body cavity.

In the second process, in order to mold a hinge on one end of the airbag door, the airbag door resin may be introduced into the main body cavity of the mold in which the main body resin is introduced, to integrally mold the hinge with the main body.

In the second process, injection molding of the airbag door resin may be delayed by a predetermined time compared to injection molding of the main body resin for introduction of the airbag door resin into the main body cavity, in which the main body resin is introduced, to form the hinge.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
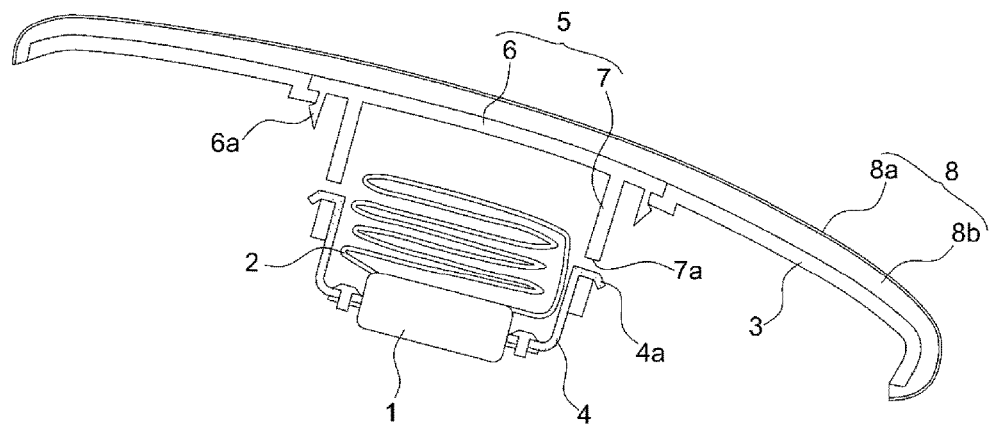
FIG. 1 is a view illustrating a configuration of a conventional PAB module assembly-type crash pad.
Figure 2:
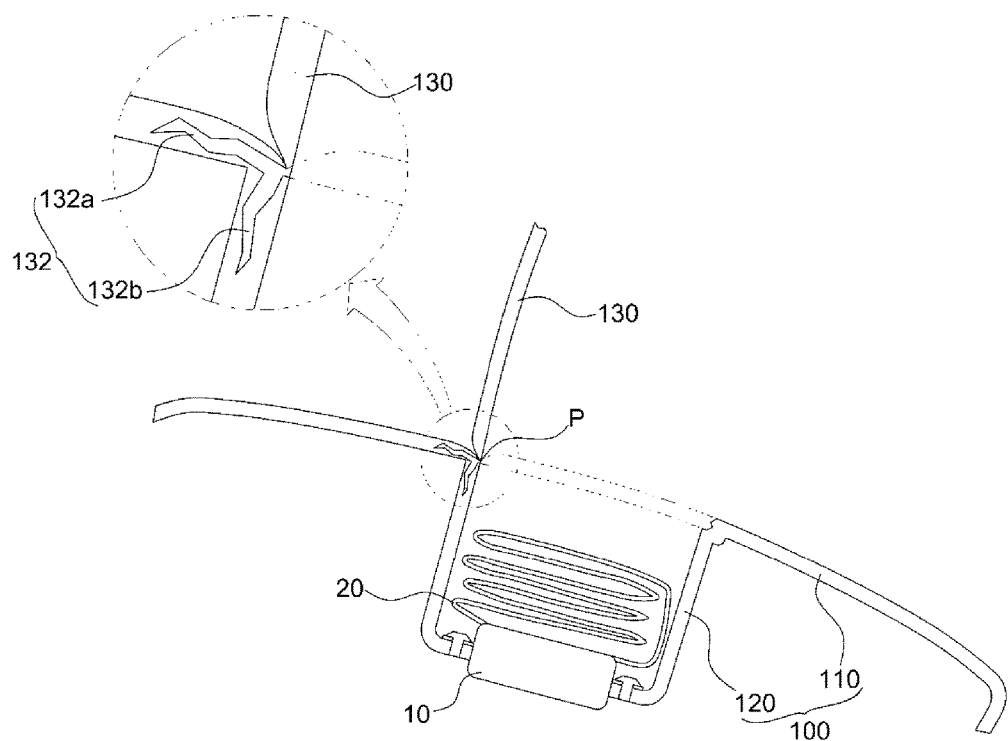
FIG. 2 is a view illustrating a cross section of a crash pad for a vehicle having an integrated airbag door and housing in accordance with various embodiments of the present invention.

As illustrated in FIG. 2, in a crash pad having an integrated airbag door and housing, manufactured in accordance with the present invention, a passenger-side airbag (PAB) module for a vehicle includes an inflator 10, which generates gas when a car collision occurs, an airbag cushion 20, which is inflated by the gas supplied from the inflator 10, an airbag housing 120, which accommodates the airbag cushion 20 therein, and an airbag door 130, which opens or closes the airbag housing 120 provided at the center of a crash pad core 110.

The present invention has a feature such that a main body 100, which includes the airbag housing 120 and the crash pad core 110, and the airbag door 130 are integrally molded via double injection. Accordingly, various embodiments of the present invention are devised to provide the configuration of an injection-molded article in order to allow the injection-formed article to be easily discharged from a mold, and to provide a manufacturing method using the mold.

To this end, there is provided a mold 200, which serves to integrally form the main body 100, which includes the airbag housing 120 and the crash pad core 110, and the airbag door 130 formed with each other via injection molding such that the airbag door 130 is injection-molded so as to be upright in an open state in the direction in which the injection-molded article is discharged from the mold 200.

Figure 3:
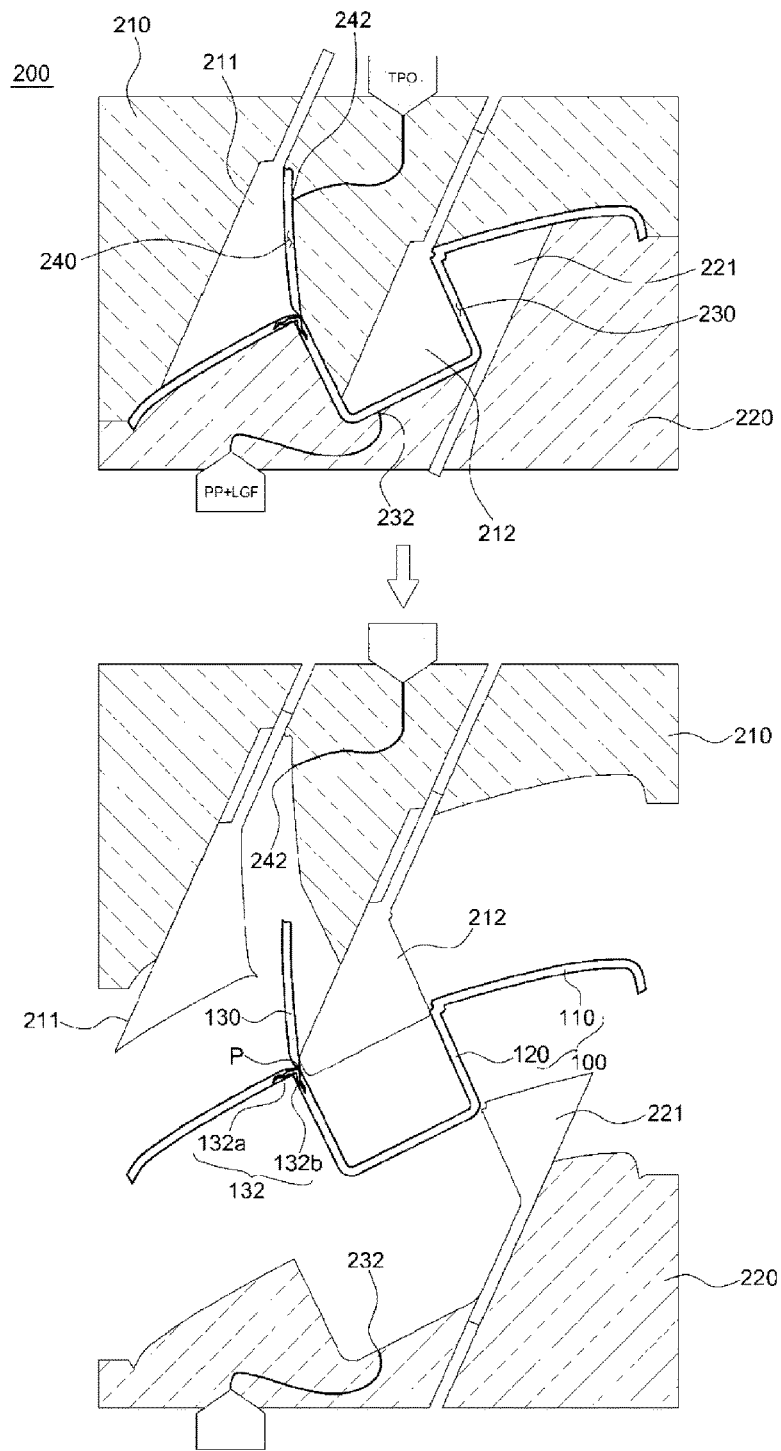
FIG. 3 is a schematic view illustrating a mold for the manufacture of the crash pad having the integrated airbag door and housing in accordance with various embodiments of the present invention.

Referring to FIG. 3, the mold 200 includes an upper mold 210 and a lower mold 220 for the double injection of the main body 100 and the airbag door 130. The mold 200 includes a first upper slide core 211 and a second upper slide core 212 provided at the upper core 210, and a lower slide core 221 provided at the lower mold 220.

Specifically, the mold 200 is configured to enable a resin to be introduced into a main body cavity 230 and to be charged when the upper mold 210 and the lower mold 220 are closed. The first upper slide core 211 and the second upper slide core 212 are slidably disposed at the bottom of the upper mold 210, and the lower slide core 221 is slidably disposed at the top of the lower mold 220.

More specifically, the main body cavity 230 is the space surrounded by the upper mold 210, the lower mold 220, the first upper slide core 211, the second upper slide core 212, and the lower slide core 221 when the mold 200 is closed.

When the upper mold 210 and the lower mold 220 are closed, the first upper slide core 211 comes into contact with one surface of an airbag door cavity 240, and simultaneously comes into contact with one side surface of the main body cavity 230 (i.e. a cavity section that is connected to the airbag door cavity 240 and serves to form the crash pad core 110). In addition, when the upper mold 210 and the lower mold 220 are closed, the second upper slide core 212, which protrudes from the bottom center of the upper mold 210, comes into contact with the central upper surface of the main body cavity 230 (i.e. a cavity section that serves to form the airbag housing 120) at a position spaced apart from the airbag door cavity 240.

At this time, one end (hinge point) of the airbag door cavity 240 is connected to the main body cavity 230. The airbag door cavity 240 has a linear shape that is vertically upright in the same direction as the vertical movement direction of the upper mold 210, i.e. is vertically upright so as to correspond to the direction in which the injection-molded article is discharged from the upper mold 210.

In addition, when the upper mold 210 and the lower mold 220 are closed, the lower slide core 221 comes into contact with an opposite side surface of the main body cavity 230 above the lower mold 220 (i.e. a cavity section that is separated from the airbag door cavity 240 and serves to form the crash pad core 110 and the airbag housing 120).

More specifically, the airbag door cavity 240 is the space surrounded by the upper mold 210 and the first upper slide core 211.

With the mold 200 having the configuration described above, when attempting to discharge the injection-molded article (i.e. the injection-molded article in which the main body 100 and the airbag door 130 are integrally molded), the upper mold 210 and the first upper slide core 211 move in the same direction as the airbag door cavity 240, and the first and second upper slide cores 211 and 212 slide without interference with the injection-molded article, and accordingly the injection-molded article in which the main body 100 and the airbag door 130 are integrally molded can be discharged.

The lower mold 220 pushes the injection-molded article upward using a push pin after the upper mold 210 is opened. At this time, the lower slide core 221 begins to slide at an appropriate point in time so as not to interfere with the injection-molded article.

When the mold 200 described above has been provided, a main body resin is introduced into the main body cavity 230 of the mold 200 for forming the main body 100, and an airbag door resin is introduced into the airbag door cavity 240 for forming the airbag door 130. Accordingly, the main body 100, which includes the crash pad core 110 and the airbag housing 120, and the airbag door 130, which has a hinge 132 on one end thereof, are integrally molded with each other at the same time.

In order to form the hinge 132 on one end of the airbag door 130, the airbag door resin is introduced into the main body cavity 230 in which the main body resin has been introduced. Accordingly, the hinge 132 is formed so as to be surrounded by the main body resin.

The airbag door 130, integrally molded with the main body 100, is upright in the same direction as the vertical movement direction of the upper mold 210 about the hinge point P (i.e. the connection point between the airbag door 130 and the hinge 132). The airbag door 130 is simultaneously molded with the main body 100 so as to be connected to the main body 100 via the hinge 132.

The main body 100 is formed of the main body resin, which is a composite of polypropylene (PP) and glass fiber (GF). The airbag door 130 is formed of the airbag door resin, such as thermoplastic olefin (TPO), which exhibits relatively high tensile elongation at break point.

At this time, the main body resin is a composite containing GF in an amount of 30±10 wt %, and more specifically, a composite containing PP in an amount of 70±10 wt % and GF in an amount of 30±10 wt %. For example, GF may be long glass fiber (LGF).

Because the main body 100 and the airbag door 130 are simultaneously formed via double injection using the main body resin and the airbag door resin, which differ from each other, as described above, when attempting to bend the molded airbag door 130 relative to the hinge 132 in order to fixedly assemble the airbag door 130 at the closing position at which the airbag door 130 closes the space of the airbag housing 120 (i.e., the space in which the airbag cushion 20 is accommodated), the hinge 132 may exhibit flexible rigidity and tensile stress in order to endure centrifugal force caused by the rotation of the airbag door 130 when the airbag cushion 20 is deployed.

More specifically, the hinge 132 is integrally molded on one end of the airbag door 130 so as to be bendable in the direction in which the airbag housing 120 is opened or closed, and is integrally molded at the connection between the crash pad core 110 and the airbag housing 120 of the main body 100. Specifically, the hinge 132 includes a first hinge 132a, which is inserted into the crash pad core 110, and a second hinge 132b, which is inserted into the airbag housing 120.

In addition, the airbag door 130 is provided at the opposite end thereof with a holding structure, in which the opposite end of the airbag door 130 is pushed by pressure and fixedly assembled to an opposite connection region between the crash pad core 110 and the airbag housing 120 (i.e. the upper end of the airbag housing 120, in which the crash pad core 110 and the airbag housing 120 are integrally connected to each other).

In addition, in order to prevent the airbag door resin from being mixed with the main body resin and to achieve sufficient hinge rigidity, the time during which an airbag door gate 242 is opened for the introduction of the airbag door resin is delayed by a predetermined time compared to the time during which a main body gate 232 is opened for the introduction of the main body resin. Accordingly, the injection molding of the airbag door resin is delayed for a longer time than the injection molding of the main body resin, and accordingly the airbag door resin is introduced into the main body cavity 230 in which the main body resin has been introduced, so as to form the hinge 132.

That is, in order to provide the hinge 132 with sufficient rigidity, the hinge 132 needs to be molded inside the main body 100 in a sandwich form. This molding of the hinge 132 may be controlled by adjusting the amount of the airbag door resin that is introduced into the main body. To this end, the open time of the airbag door gate 242 may be delayed compared to the open time of the main body gate 232 and may be appropriately adjusted.

Figure 4:
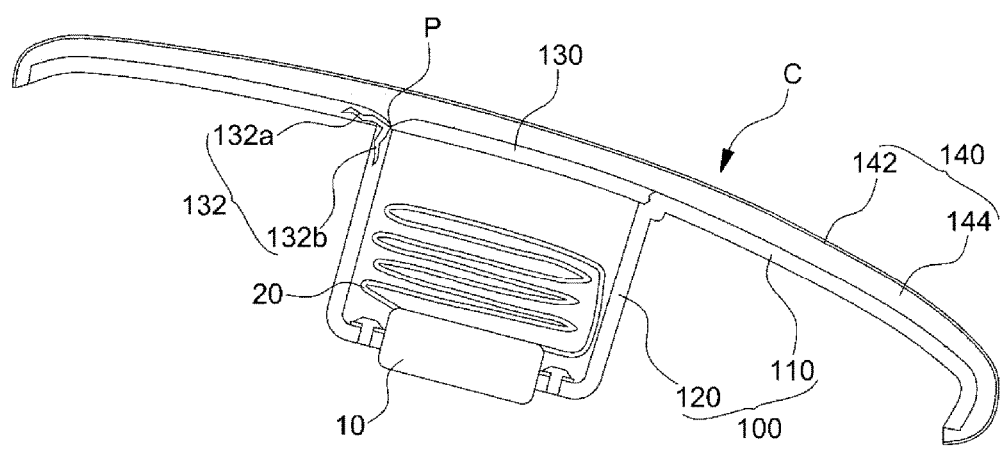
FIG. 4 is a view illustrating the crash pad having the integrated airbag door and housing in accordance with various embodiments of the present invention.

Meanwhile, as illustrated in FIG. 4, as skin foam 140 is attached to the surfaces of the crash pad core 110 and the airbag door 130 in the state in which the airbag door 130 is closed, a crash pad C, which includes the crash pad core 110, the airbag door 130, and the skin foam 140, is formed.

The skin foam 140 includes a skin layer 142, which is disposed on the outer surface of the crash pad C and is exposed outward, and a foamed layer 144 on the inner surface of the skin layer 142.

As the foamed layer 144 is formed by introducing a foam solution into the gap between the outer surfaces of the crash pad core 110 and the airbag door 130 and the skin layer 142, the skin foam 140 is stacked on and attached to the outer surfaces of the crash pad core 110 and the airbag door 130.

In this way, when the airbag cushion 20 is unfolded when a car collision occurs, the airbag door 30 is pushed by the airbag cushion 20, thereby breaking the skin foam 140 so as to open the space in the airbag housing 120.

Hereinafter, the configuration of the crash pad having the integrated airbag door and housing, manufactured using the mold 200 for the simultaneous molding of the main body 100 and the airbag door 130, will be described.

As illustrated in FIGS. 2 and 4, the crash pad having the integrated airbag door and housing includes the main body 100, which includes the crash pad core 110 and the airbag housing 120, and the airbag door 130, which is integrally injection-molded with the main body 100 so as to open or close the space in the airbag housing 120, the molded airbag door 130 being vertically upright in a linear form to open the airbag housing 120 in a direction in which it is discharged from the mold 200.

The airbag housing 120 is integrally or monolithically formed at the center of the crash pad core 110 so as to define a space in which the airbag cushion 20 is accommodated.

The hinge 132 for connection with the main body 100 is provided on one end of the airbag door 130. The hinge 132 is formed so as to be inserted into the main body 100. Specifically, the hinge 132 is configured such that the first hinge 132a is inserted into the crash pad core 110 and the second hinge 132b is inserted in the airbag housing 120.

The hinge 132 is integrally molded on one end of the airbag door 130 so as to be bendable in the direction in which the airbag housing 120 is opened or closed, and is integrally molded at the connection region between the crash pad core 110 and the airbag housing 120.

The crash pad having the integrated airbag door and housing, manufactured as described above, may achieve the following effects owing to the integrated molding of the airbag door 130, the airbag housing 120, and the crash pad core 110.

First, it is possible to prevent problems related to the abnormal deployment of the airbag cushion because tears of the airbag cushion, caused by assembly structures between constituent elements, do not occur.

Second, it is possible to prevent defects with regard to the molding and external appearance due to the leakage of a foam solution at the connection region between the constituent elements when the foamed layer of the skin foam is molded.

Third, it is possible to omit an existing mounting bracket, which is typically used in order to connect the airbag housing to a cowl cross bar to prevent motion thereof.

Fourth, it is not necessary to post-process, on the crash pad core, a deployment line, which is required to cause the crash pad core to be broken when the airbag cushion is deployed, which results in reduced costs.

In conclusion, according to various embodiments of the present invention, it is possible to ensure enhanced deployment performance of an airbag cushion, to prevent deterioration in the external appearance of a crash pad having an integrated airbag door and housing, and to improve the formability of the crash pad. In addition, it is possible to reduce the weight and cost of the crash pad owing to the obviation of constituent elements as well as the obviation of assembly and processing operations.

For convenience in explanation and accurate definition in the appended claims, the terms "upper" or "lower", "inner" or "outer" and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A crash pad for a vehicle having an integrated airbag door and housing, the crash pad comprising:
   a main body including a crash pad core, and an airbag housing integrally formed at a center of the crash pad core defining a space for accommodation of an airbag cushion therein; and
   an airbag door integrally injection-molded with the main body selectively to open and close the space in the airbag housing, the airbag door molded upright in a direction in which the molded airbag door is discharged from a mold to open the airbag housing,
   wherein the airbag door includes a hinge provided on one end of the airbag door for connection with the main body, and
   wherein the hinge includes a first hinge integrally molded with the crash pad core for insertion into the crash pad core, and a second hinge integrally molded with the airbag housing for insertion into the airbag housing.

2. The crash pad of claim 1, wherein the hinge is integrally molded with the main body, as an airbag door resin for molding the hinge is introduced into a main body cavity of the mold in which a main body resin for molding the main body is introduced.

3. The crash pad of claim 2, wherein injection molding of the airbag door resin is delayed by a predetermined time compared to injection molding of the main body resin for introduction of the airbag door resin into the main body cavity, in which the main body resin is introduced, so as to form the hinge.

4. The crash pad of claim 2, wherein the airbag door includes a holding structure on an opposite end of the airbag door, wherein the holding structure disposed on the opposite end of the airbag door is fixedly assembled by pressure to a connection region between the crash pad core and the airbag housing.

5. The crash pad of claim 2, wherein the airbag door resin comprises thermoplastic olefin (TPO), and the main body resin comprises a composite of polypropylene (PP) and glass fiber (GF), for simultaneous molding of the airbag door and the main body via double injection.

6. The crash pad of claim 1, wherein skin foam is attached to an outer surface of the crash pad core and the airbag door, and the skin foam includes a skin layer and a foamed layer on an inner surface of the skin layer.

7. A method of manufacturing a crash pad for a vehicle having an integrated airbag door and housing, the method comprising:
   a first process of providing a mold, which is used to integrally form a main body including a crash pad core and an airbag housing, with an airbag door via injection molding such that the airbag door is injection-molded upright in a direction in which the airbag door is discharged from the mold so as to open the airbag housing; and a second process of simultaneously molding the main body and the airbag door to be integrally formed with each other by introducing a main body resin and an airbag door resin into a main body cavity and an airbag door cavity of the mold, respectively, wherein the airbag door includes a hinge provided on one end of the airbag door for connection with the main body, and wherein the hinge includes a first hinge integrally molded with the crash pad core for insertion into the crash pad core, and a second hinge integrally molded with the airbag housing for insertion into the airbag housing.

8. The method of claim 7, wherein, in the mold provided in the first process, the main body cavity is defined when an upper mold and a lower mold are closed, the upper mold is provided at a bottom of the upper mold with a first upper slide core, which is configured to come into contact with the airbag door cavity, and a second upper slide core, which is configured to come into contact with the main body cavity at a position spaced apart from the airbag door cavity, and one end of the airbag door cavity is integrally connected to the main body cavity.

9. The method of claim 7, wherein, in the second process, in order to mold the hinge on the one end of the airbag door, the airbag door resin is introduced into the main body cavity of the mold in which the main body resin is introduced, to integrally mold the hinge with the main body.

10. The method of claim 9, wherein, in the second process, injection molding of the airbag door resin is delayed by a predetermined time compared to injection molding of the main body resin for introduction of the airbag door resin into the main body cavity, in which the main body resin is introduced, to form the hinge.

11. The method of claim 9, wherein the airbag door includes a holding structure on an opposite end of the airbag door, wherein the holding structure disposed on the opposite end of the airbag door is fixedly assembled by pressure to a connection region between the crash pad core and the airbag housing.

12. The method of claim 7, wherein the airbag door resin comprises thermoplastic olefin (TPO), and the main body resin comprises a composite of polypropylene (PP) and glass fiber (GF), for simultaneous molding of the airbag door and the main body via double injection.

\* \* \* \* \*